(12) United States Patent
Takahashi et al.

(10) Patent No.: US 9,103,428 B2
(45) Date of Patent: Aug. 11, 2015

(54) STRUCTURE FOR COUPLING V-BELT TYPE CONTINUOUSLY VARIABLE TRANSMISSION WITH ENGINE

(71) Applicant: KAWASAKI JUKOGYO KABUSHIKI KAISHA, Hyogo (JP)

(72) Inventors: Keiji Takahashi, Akashi (JP); Nobuki Inoue, Akashi (JP); Yuji Kouma, Takasago (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 349 days.

(21) Appl. No.: 13/833,959

(22) Filed: Mar. 15, 2013

(65) Prior Publication Data

US 2014/0274515 A1 Sep. 18, 2014

(51) Int. Cl.
  F16H 7/24    (2006.01)
  B62J 13/00   (2006.01)
  F16D 1/00    (2006.01)
  F16H 57/02   (2012.01)
  F16H 57/025  (2012.01)
  B60K 17/00   (2006.01)
  F16H 57/035  (2012.01)

(52) U.S. Cl.
  CPC .............. *F16H 57/025* (2013.01); *B60K 17/00* (2013.01); *F16H 57/035* (2013.01); *F16H 2057/0203* (2013.01)

(58) Field of Classification Search
  CPC ................. F16H 57/0489; F16H 9/18; F16H 2057/0203; F16H 57/0415; F02B 61/02
  USPC .......................................... 474/150, 144, 146
  See application file for complete search history.

(56) References Cited

U.S. PATENT DOCUMENTS

| 2,189,294 | A | * | 2/1940 | Pfleger | 474/29 |
| 3,383,933 | A | * | 5/1968 | Shultz et al. | 474/135 |
| 3,467,177 | A | * | 9/1969 | Hoddinott | 165/47 |
| 4,493,677 | A | * | 1/1985 | Ikenoya | 474/93 |
| 4,531,928 | A | * | 7/1985 | Ikenoya | 474/93 |
| 4,631,977 | A | * | 12/1986 | Kawashima | 74/606 A |
| 4,671,782 | A | * | 6/1987 | Ochiai et al. | 474/93 |
| 4,723,619 | A | * | 2/1988 | Yamamoto et al. | 180/219 |
| 5,976,044 | A | * | 11/1999 | Kuyama | 474/93 |
| 6,267,700 | B1 | * | 7/2001 | Takayama | 474/93 |
| 6,398,683 | B1 | * | 6/2002 | Fukuda | 474/144 |
| 6,544,134 | B2 | * | 4/2003 | Ohyama et al. | 474/144 |
| 6,808,465 | B2 | * | 10/2004 | Kuga et al. | 474/14 |
| 7,201,686 | B2 | * | 4/2007 | Masuda et al. | 474/144 |
| 7,281,596 | B2 | * | 10/2007 | Fukuda | 180/68.2 |
| 7,303,495 | B2 | * | 12/2007 | Schoenek et al. | 474/144 |
| 7,316,626 | B2 | * | 1/2008 | Oishi et al. | 474/144 |
| 7,427,248 | B2 | * | 9/2008 | Chonan | 474/93 |
| 7,506,718 | B2 |   | 3/2009 | Morita et al. | |
| 7,686,123 | B2 | * | 3/2010 | Ishida | 180/346 |

(Continued)

*Primary Examiner* — Henry Liu
(74) *Attorney, Agent, or Firm* — Wenderoth, Lind & Ponack, L.L.P.

(57) ABSTRACT

In a structure for coupling a V-belt type continuously variable transmission with an engine of a vehicle, the engine includes a first opening through which a crankshaft passes. A coupling plate mounted on a plate mounting surface that surrounds the first opening includes a second opening through which the crankshaft and an upper end flange of the oil pan pass. First and second seal plates are disposed on front and back surfaces of the coupling plate, and the first and second seal plates seal a space into which the upper end flange is inserted. A liquid seal agent seals gaps of various locations of the second opening.

5 Claims, 10 Drawing Sheets

(56) References Cited

U.S. PATENT DOCUMENTS

| | | | |
|---|---|---|---|
| 7,771,299 B2* | 8/2010 | Mochizuki et al. | 474/12 |
| 8,038,557 B2* | 10/2011 | Aoyama | 474/144 |
| 8,202,181 B2* | 6/2012 | Oishi et al. | 474/8 |
| 8,337,346 B2* | 12/2012 | Kochidomari et al. | 474/144 |
| 8,382,620 B2* | 2/2013 | Morita | 474/13 |
| 8,512,181 B2* | 8/2013 | Mitsubori et al. | 474/8 |
| 8,840,496 B2* | 9/2014 | Yamanishi et al. | 474/144 |
| 2001/0029215 A1* | 10/2001 | Ohyama et al. | 474/148 |
| 2004/0171449 A1* | 9/2004 | Oishi et al. | 474/144 |
| 2005/0239591 A1* | 10/2005 | Schoenek et al. | 474/144 |
| 2005/0239592 A1* | 10/2005 | Schoenek et al. | 474/144 |
| 2005/0272544 A1* | 12/2005 | Ho | 474/144 |
| 2006/0122017 A1* | 6/2006 | Masuda et al. | 474/144 |
| 2006/0172839 A1* | 8/2006 | Masuda et al. | 474/144 |
| 2006/0270503 A1* | 11/2006 | Suzuki et al. | 474/144 |
| 2007/0219030 A1* | 9/2007 | Ho | 474/144 |
| 2008/0032841 A1* | 2/2008 | Oishi et al. | 474/242 |
| 2010/0120565 A1* | 5/2010 | Kochidomari et al. | 474/144 |
| 2010/0167853 A1* | 7/2010 | Morita | 474/13 |

* cited by examiner

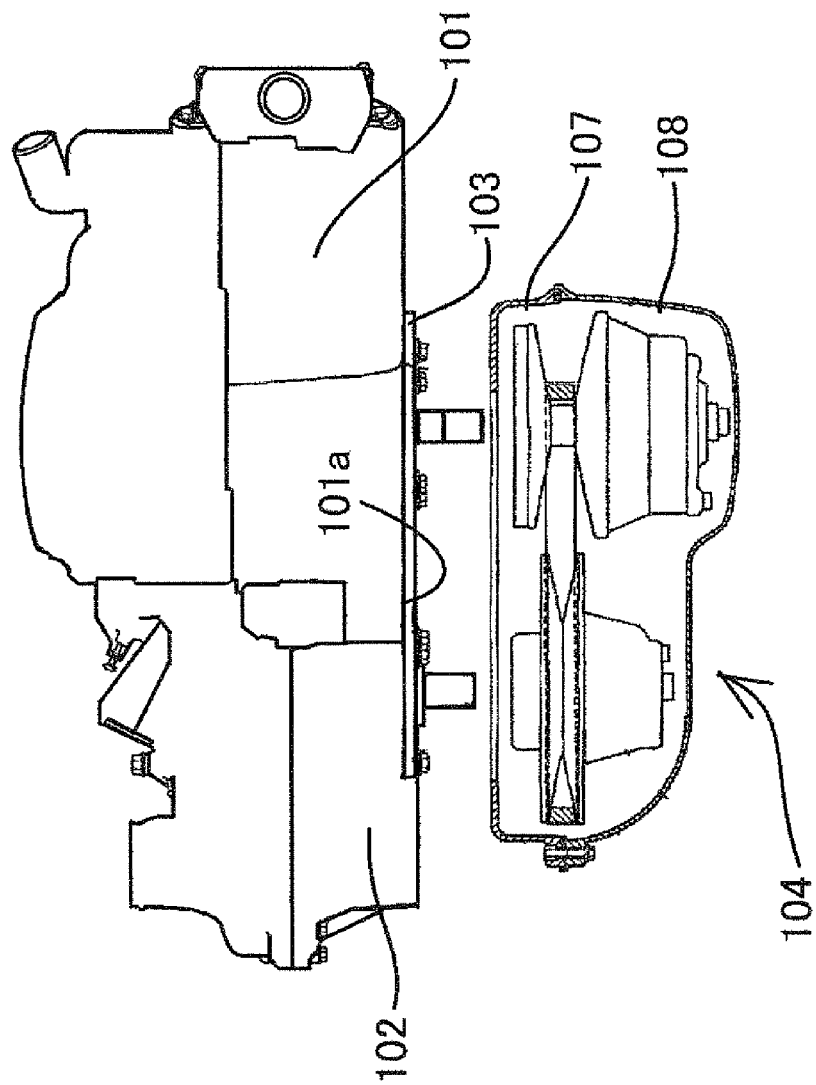

STRUCTURE FOR COUPLING V-BELT TYPE CONTINUOUSLY VARIABLE TRANSMISSION WITH ENGINE

BACKGROUND OF INVENTION

1. Field of the Invention

The present invention mainly relates to a structure for coupling a V-belt type continuously variable transmission with an engine installed in a vehicle.

2. Description of the Prior Art

U.S. Pat. No. 7,506,718B2 discloses a utility vehicle equipped with an engine and a V-belt type continuously variable transmission. As shown in FIG. 12, an engine 101 and a gear type transmission 102 are opposed to each other in a front-rear direction, and they are coupled with each other through a side coupling plate 103. A V-belt type continuously variable transmission 104 is disposed beside the engine 101 and the gear type transmission 102.

A transmission case 107 of the V-belt type continuously variable transmission 104 is mounted on the coupling plate 103, and a case cover 108 is mounted on the transmission case 107.

If the engine 101 itself installed in the utility vehicle is produced in accordance with such a specification that the V-belt type continuously variable transmission 104 is to be mounted on the engine 101, it is not difficult to seal coupled surfaces between the engine 101 and the coupling plate 103 so that water does not enter the transmission case 107 from outside through the coupled surfaces or the like.

However, when using an engine which is not produced in accordance with the specification that the V-belt type continuously variable transmission is to be mounted on the engine, a coupling plate having a shape different from that of an engine cover is mounted on a mounting surface on which the engine cover is usually mounted, and consequently, it becomes difficult to seal coupled portions. Especially, a utility vehicle often runs on fields, mountains, and sandy beach, and high waterproof property is desired.

SUMMARY OF THE INVENTION

It is an object of the present invention to excellently seal coupled portions between an engine and a V-belt type continuously variable transmission by combining a plurality of seal plates even if an opening through which a crankshaft of an engine case passes has a complicated shape.

To solve the above problem, the invention provides a structure for coupling a V-belt type continuously variable transmission with an engine, the structure comprising: a plate mounting surface formed on one end surface of an engine case in a crankshaft direction, the plate mounting surface including a first opening through which a crankshaft passes, a lower end of the first opening being closed by an upper end flange of an oil pan mounted on a lower end of the engine case; a coupling plate mounted on the plate mounting surface, the coupling plate including a second opening through which the crankshaft and the upper end flange of the oil pan pass and a transmission case mounting surface, a first seal plate that is mounted on a lower surface of the upper end flange and that covers a lower portion of the second opening from an engine case side, the first seal plate having an L-shaped cross section; and a second seal plate that is mounted on a transmission case side of the coupling plate and that includes a recess covering ends of connected portions between the upper end flange and the first seal plate.

According to this configuration, even if the engine has a crankshaft penetrating opening of a complicated shape, the V-belt type continuously variable transmission can be coupled with the engine by the coupling plate and the first and second seal plates. In addition, the coupling plate can be sealed, and it is possible to prevent water and mud from entering the V-belt type continuously variable transmission from outside.

In the present invention, it is preferable that a liquid seal agent is charged between the ends of the connected portions and a recess of the second seal plate.

According to this configuration, it is possible to easily seal the end of the upper end flange of the oil pan by using the liquid seal agent.

In the present invention, it is preferable that the coupling plate further includes a starter mounting portion.

According to this configuration, the coupling plate can also be used as a starter mounting member, thus reducing the number of parts.

In the present invention, it is preferable that the coupling plate further includes a rotation-number sensor mounting portion.

According to this configuration, the coupling plate can also be used as a rotation-number sensor mounting member, thus reducing the number of parts.

In the present invention, it is preferable that an elastic seal member is interposed between the first seal plate and the coupling plate.

According to this configuration, sealing performance between the first seal plate and the coupling plate is enhanced.

BRIEF DESCRIPTION OF THE DRAWINGS

The object features, and advantages of the present invention will become more apparent from the following description with reference to the accompanying drawings.

FIG. 12 is a plan view of a conventional example.

DETAILED DESCRIPTION OF THE INVENTION

FIGS. 1 to 11 show a power unit U for a utility vehicle including an engine and a V-belt type continuously variable transmission according to the present invention, and one embodiment of the present invention will be described based on these drawings. For convenience of description, in the following, a front-rear direction of the vehicle is called a front-rear direction of the engine, the V-belt type continuously variable transmission, and other parts, and in a width direction of the vehicle, a right-left direction as viewed from a driver in the vehicle (right-left direction as viewed forward from rear of vehicle) is called a right-left direction of the vehicle, the engine, the V-belt type continuously variable transmission, and other parts.

Figure 1:
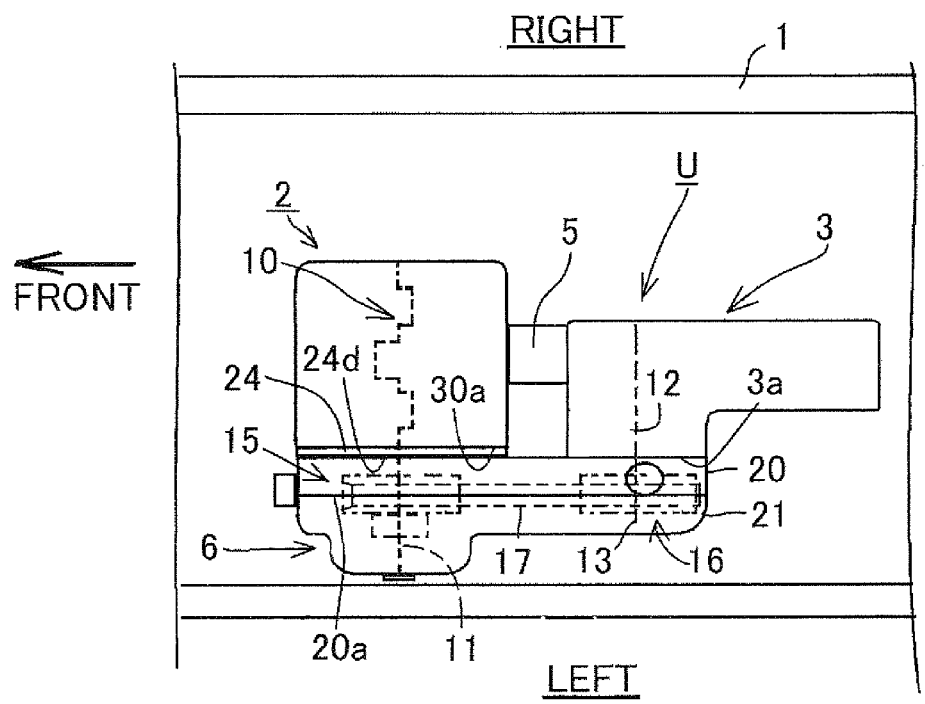
FIG. 1 is a plan view of a power unit for a utility vehicle including an engine and a V-belt type continuously variable transmission according to the present invention.

FIG. 1 is a plan view of the power unit U. The power unit U is installed in a main frame 1 of the utility vehicle. The power unit U includes an engine 2, a gear type transmission 3 disposed behind the engine 2, a coupling bracket 5 which rigidly couples the gear type transmission 3 with the engine 2, and a V-belt type continuously variable transmission 6 disposed on a left side of the engine 2 and the gear type transmission 3. The engine 2 is a parallel three-cylinder engine in which three cylinders are arranged in a vehicle-width direction.

The coupling bracket 5 is disposed between the engine 2 and the gear type transmission 3 in a front-rear direction, and the coupling bracket 5 rigidly couples a front end of the gear type transmission 3 with a rear end of the engine 2.

The V-belt type continuously variable transmission 6 includes a variable speed input shaft 11 coupled with a crankshaft 10, a drive pulley 15 mounted on the variable speed input shaft 11, a variable speed output shaft 13 coupled with an input shaft 12 of the gear type transmission 3, a driven pulley 16 mounted on the variable speed output shaft 13, and a V-belt 17 entrained between both the pulleys 15 and 16. The V-belt type continuously variable transmission 6 continuously changes speed of rotation of the crankshaft 10 and transmits the rotation to the input shaft 12 of the gear type transmission 3. Both the pulleys 15 and 16 and the V-belt 17 are covered with a transmission case 20 and a case cover 21. A right end surface of a front portion of the transmission case 20 is mounted on a transmission case mounting surface 24d of a left end of a coupling plate 24, and the coupling plate 24 is mounted on a plate mounting surface 30a formed on a left end of the engine 2. A right end surface of a rear portion of the transmission case 20 is mounted directly on a case mounting surface 3a of a left end of the gear type transmission 3. The case cover 21 is mounted on a cover mounting surface 20a of a left end of the transmission case 20 through a plurality of bolts.

Figure 2:
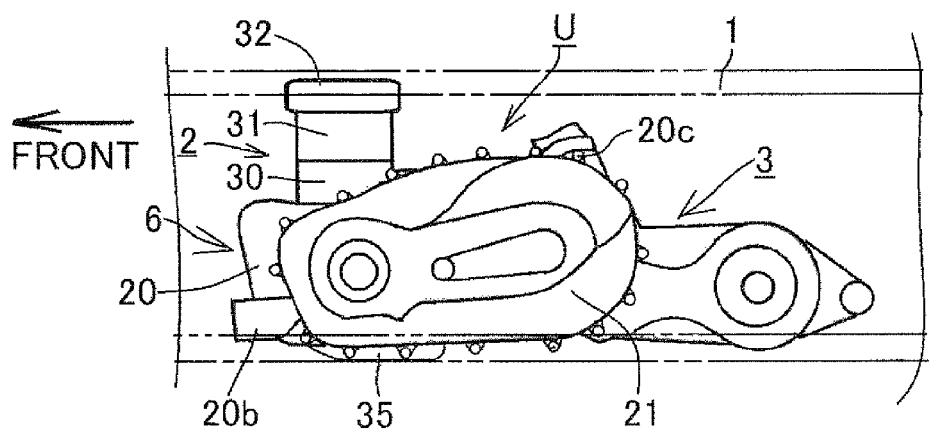
FIG. 2 is a side view of the power unit in FIG. 1.
Figure 3:
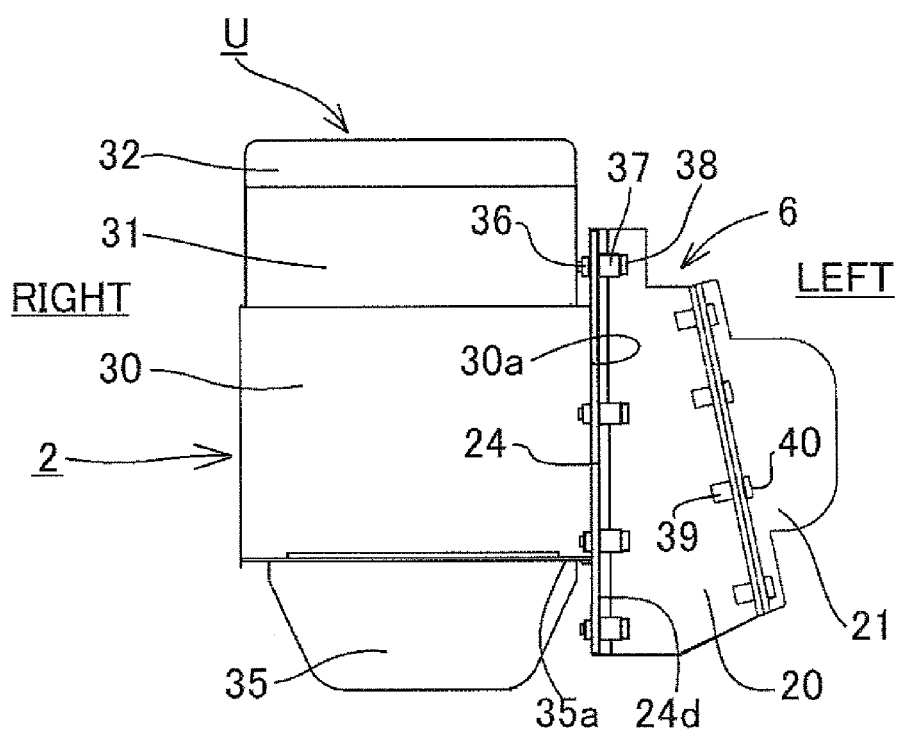
FIG. 3 is a front view of the power unit in FIG. 1.

A structure for coupling the transmission case 20 with the engine 2 will be described in detail. FIG. 2 is a left side view of the power unit U, and FIG. 3 is a front view of the power unit U. In FIG. 3, an engine case is configured by a cylinder block 30 and the like, and the cylinder block 30 is integrally provided with three cylinders and a crankcase. A cylinder head 31 and a head cover 32 are sequentially fastened to an upper end surface of the cylinder block 30. An upper end flange 35a of an oil pan 35 is fastened to a lower end surface of the cylinder block 30.

A plurality of nuts 36 are fixed to an outer periphery of a right end surface of the coupling plate 24 by welding. Bolt-insertion bosses 37 are integrally formed on the transmission case 20 at locations corresponding to the nuts 36. By threadedly engaging bolts 38 inserted into the bosses 37 of the transmission case 20 with the nuts 36 of the coupling plate 24, the transmission case 20 is mounted on the transmission case mounting surface 24d of the coupling plate 24.

In FIG. 2, a front-facing cooling air intake portion 20b is provided on a front end of the transmission case 20 of the V-belt type continuously variable transmission 6, and an upward-facing cooling air discharge portion 20c is provided on a rear end of the transmission case 20.

Figure 4:
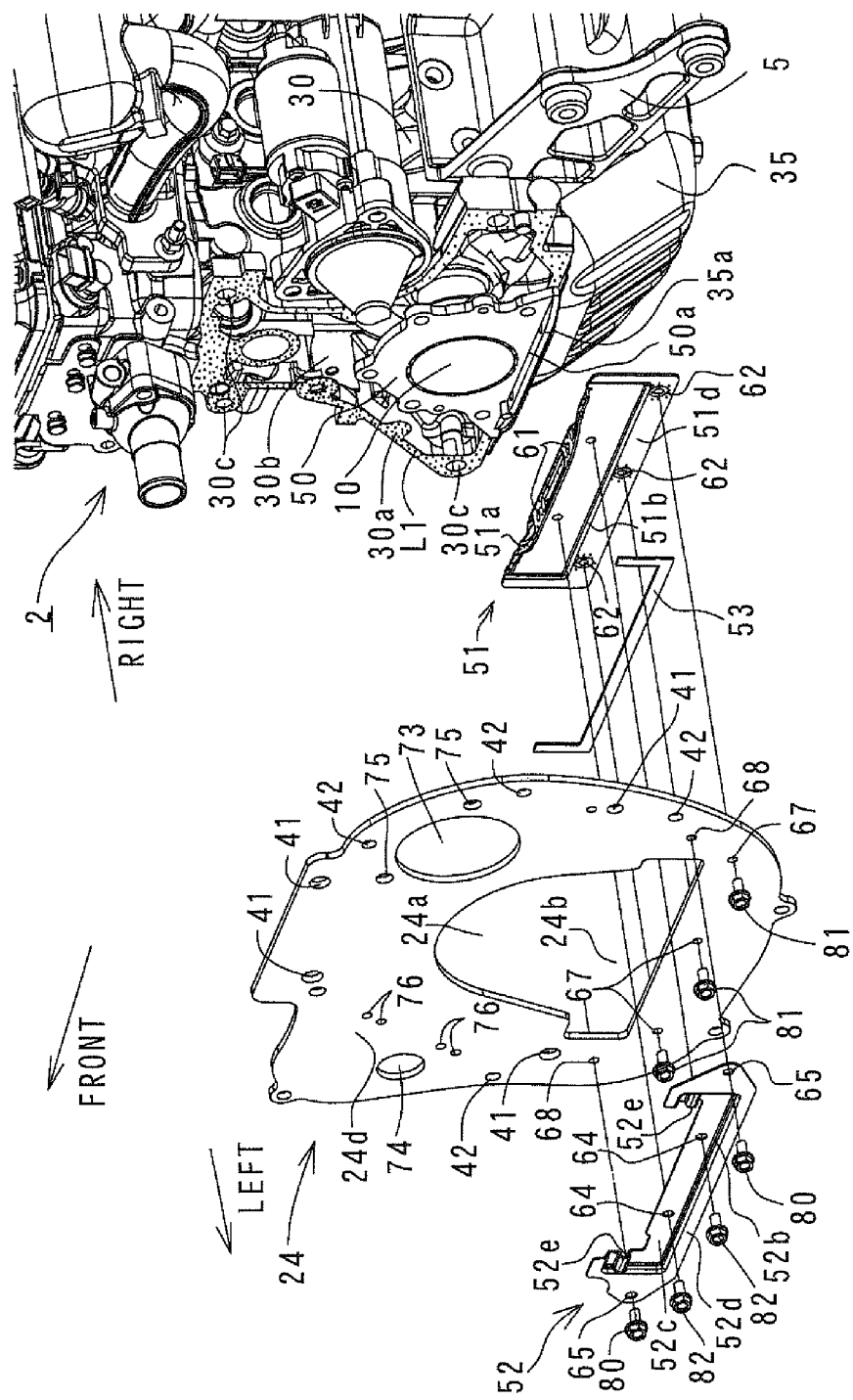
FIG. 4 is a perspective view of the engine in FIG. 1 showing a state where a coupling plate is disassembled.

FIG. 4 is a perspective view of the engine 2 showing a state where the coupling plate 24 is disassembled. In FIG. 4, a first opening 30b having such a size that at least the crankshaft 10 can pass therethrough is formed in a left end of the cylinder block 30. The plate mounting surface 30a is formed in the cylinder block 30 so as to surround an upper portion, a front portion, and a rear portion of the first opening 30b, and a lower portion of the first opening 30b is closed by a left end of the upper end flange 35a of the oil pan 35. In this embodiment, the first opening 30b has such a size that an oil seal case 50 which supports a left end of the crankshaft 10 can be accommodated therein. A plurality of female thread holes 30c for mounting the coupling plate are formed in the plate mounting surface 30a, and a liquid seal agent L1 (expressed by large number of dots) is applied to the plate mounting surface 30a.

The coupling plate 24 includes a second opening 24a having such a size that the crankshaft 10 can pass therethrough. In this embodiment, like the first opening 30b, the second opening 24a has such a size that the oil seal case 50 can be accommodated therein. A lower end of the second opening 24a has a substantially rectangular opening-expanded portion 24b, which can accommodate therein a left end of the upper end flange 35a of the oil pan 35.

First bolt insertion holes 41 for mounting the coupling plate is formed in an outer periphery of the coupling plate 24 at locations corresponding to the female thread holes 30c of the plate mounting surface 30a of the cylinder block 30. The coupling plate 24 is mounted on the plate mounting surface 30a of the cylinder block 30 by means of a plurality of bolts (not shown) inserted into the first bolt insertion holes 41. Second bolt insertion holes for mounting the transmission case are formed in the coupling plate 24 at locations corresponding to the nuts 36 (FIG. 3) for mounting the transmission case.

First and second seal plates 51 and 52 and an elastic seal member (packing member) 53 are disposed for sealing the opening-expanded portion 24b of the coupling plate 24 from outside. The first seal plate 51 is formed into a reversed-L shape as viewed from side. The first seal plate 51 is disposed on a right side (on the side of cylinder block) of the opening-expanded portion 24b of the coupling plate 24. The second seal plate 52 is disposed on a left side (on the side of the transmission case) of the opening-expanded portion 24b. The elastic seal member 53 is made of rubber or sponge, and is formed into a U-shape. The elastic seal member 53 is sandwiched between the first seal plate 51 and the coupling plate 24.

A left end of the upper end flange 35a of the oil pan 35 projects leftward more than the plate mounting surface 30a of the cylinder block 30. The oil seal case 50 is disposed on an upper surface of the left end of the upper end flange 35a of the oil pan 35.

Figure 5:
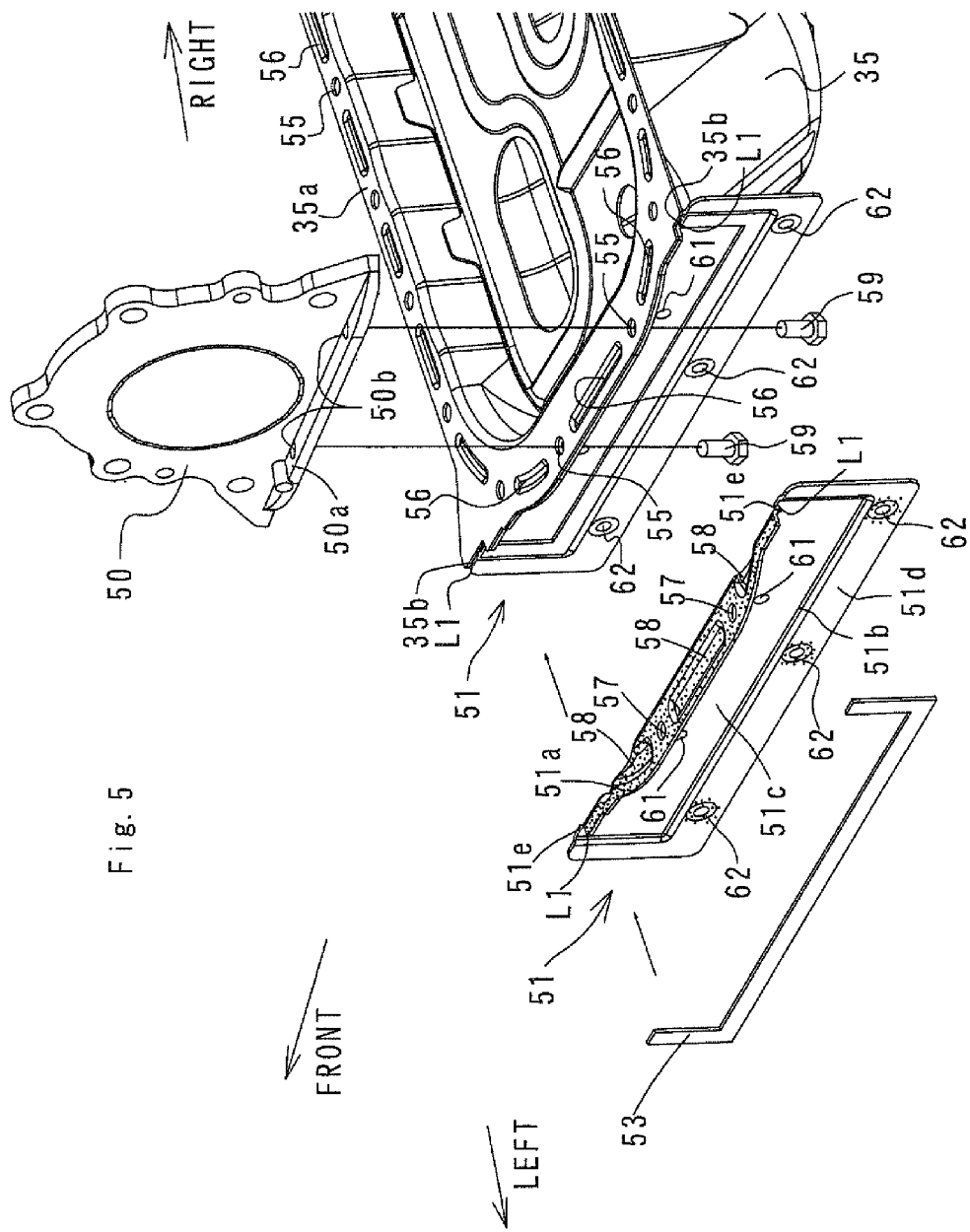
FIG. 5 is a perspective view of an oil pan showing a state where a first seal plate is mounted and removed.

FIG. 5 is an exploded perspective view of the first seal plate 51, the oil seal case 50, and the oil pan 35. FIG. 5 illustrates both states of a mounted position and a removed position of the first seal plate 51. A plurality of bolt insertion holes 55 and a plurality of positioning recesses 56 are alternately formed in the upper end flange 35a of the oil pan 35. Notches 35b are formed in front and rear ends of the left end of the upper end flange 35a. The first seal plate 51 includes a substantially horizontal upper end bent portion 51a, and notches 51e are formed in front and rear ends of the upper end bent portion 51a. A pair of bolt insertion holes 57 and three recesses 58 (two of them are only partially illustrated) are formed in the upper end bent portion 51a at locations corresponding to the pair of bolt insertion holes 55 and the three positioning recesses 56 formed in the left end of the upper end flange 35a of the oil pan 35. The liquid seal agent L1 is applied to the upper surface of the upper end bent portion 51a.

The upper end bent portion 51a of the first seal plate 51 is abutted against a lower surface of the left end of the upper end flange 35a. By threadedly engaging bolts 59 inserted into the bolt insertion holes 57 and 55 with female thread holes 50b of the oil seal case 50, the oil seal case 50 and the first seal plate 51 are coupled with the upper end flange 35a of the oil pan 35.

A vertical body of the first seal plate 51 is formed into a rectangular shape which is long in the front-rear direction, and is divided into a rectangular inside portion 51c and a wide U-shaped outside portion 51d by a U-shaped step (level difference) 51b which is wide in the front-rear direction. The inside portion 51c is displaced inward (rightward) in the vehicle-width direction from the outside portion 51d by a distance of the level difference of the step 51b. The inside portion 51c includes a pair of first female thread holes 61 which are disposed at a distance from each other in the front-rear direction. A lower end of the outside portion 51d includes three second female thread holes 62 which are disposed at distances from one another in the front-rear direction.

The elastic seal member 53 is formed into a substantially U-shape which corresponds to a shape of the step 51b of the first seal plate 51, and the elastic seal member 53 is fitted to an inner side of the step 51b.

Figure 6:
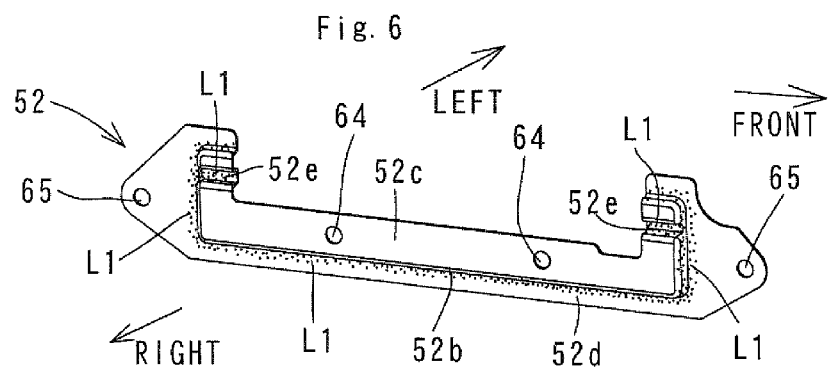
FIG. 6 is a perspective view of a second seal plate as viewed from an inner side in a vehicle-width direction.

FIG. 6 is a perspective view of the second seal plate 52 as viewed from an inner side (right side) in the vehicle-width direction. The second seal plate 52 is formed into a substantially U-shape which is wide in the front-rear direction. The second seal plate 52 is defined into a substantially U-shaped inside portion 52c and a substantially U-shaped outside portion 52d by a U-shaped step (level difference) 52b which is wide in the front-rear direction. The inside portion 52c is displaced inward (rightward) in the vehicle-width direction from the outside portion 52d by a distance of a level difference of the step 52b. The inside portion 52c includes a pair of first bolt insertion holes 64 disposed at a distance from each other in the front-rear direction, and both front and rear ends of the outside portion 52d include second bolt insertion holes 65. A pair of recesses 52e is formed in upper portions of front and rear ends of the inside portion 52c. The recesses 52e are recessed from the inside portion 52c outward (leftward) in the vehicle-width direction.

In FIG. 4, the coupling plate 24 includes, in addition to the first and second bolt insertion holes 41 and 42, three third bolt insertion holes 67 at locations corresponding to the three second female thread holes 62 of the first seal plate 51, and a pair of female thread holes (or nuts) 68 at locations corresponding to the second bolt insertion holes 65 of the front and rear ends of the second seal plate 52.

Figure 11:
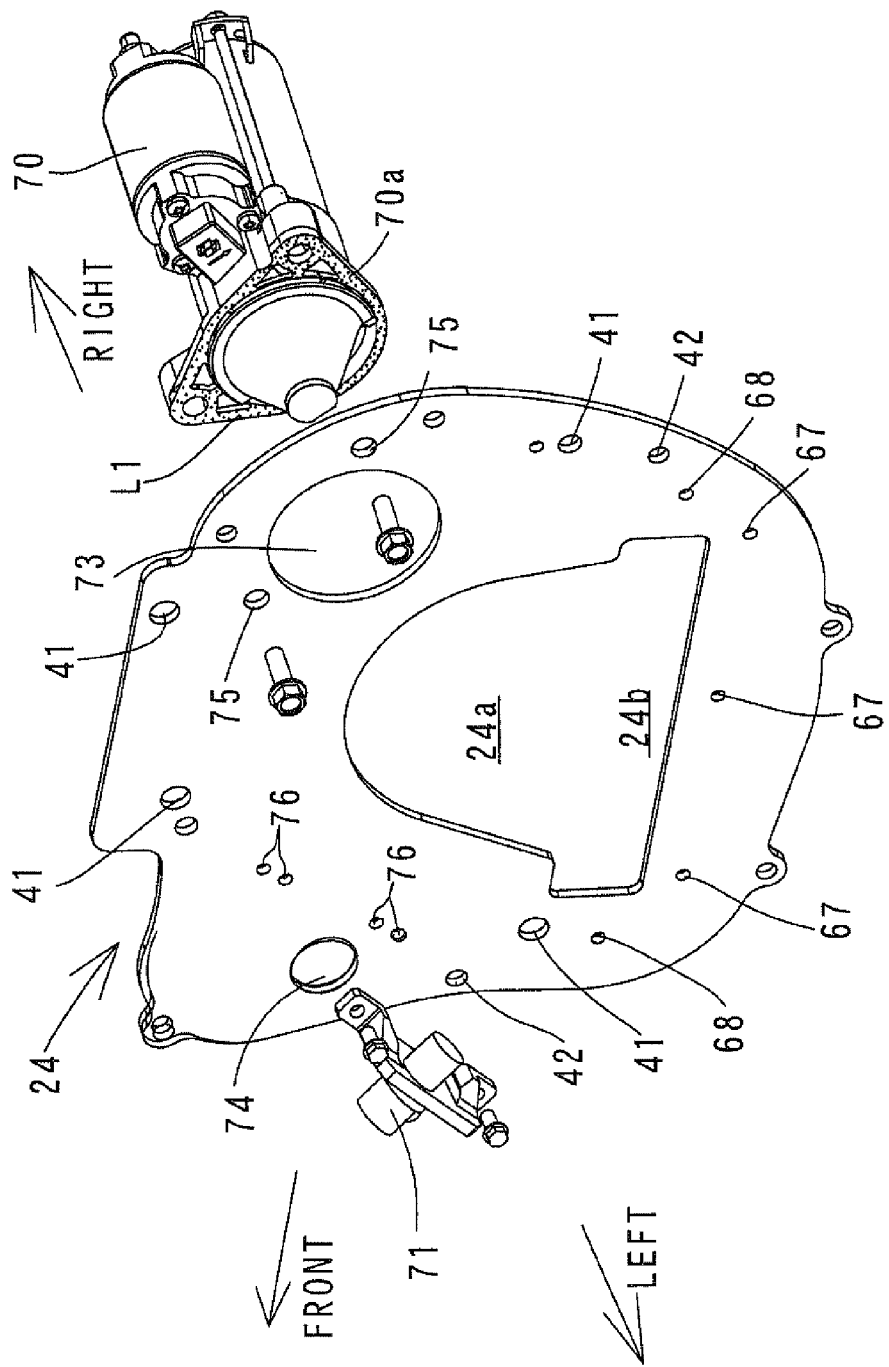
FIG. 11 is an exploded perspective view of the coupling plate, in a state where the starter motor and a rotation-number sensor are mounted.

FIG. 11 is an exploded perspective view of the coupling plate 24, a starter motor 70 and a rotation-number sensor 71. In FIG. 11, in addition to the second opening 24a including the opening-expanded portion 24b, the coupling plate 24 is provided at its rear upper end with a first mounting hole 73 for mounting the starter motor 70, and is also provided at its front upper end with a second mounting hole 74 for taking out a harness of the rotation-number sensor 71.

Since the first and second mounting holes 73 and are formed, bolt insertion holes 75 for fixing the starter motor 70 are formed in the vicinity of the first mounting hole 73, and female thread holes 76 for fixing the rotation-number sensor 71 are formed in the vicinity of the second mounting hole 74.

Figure 7:
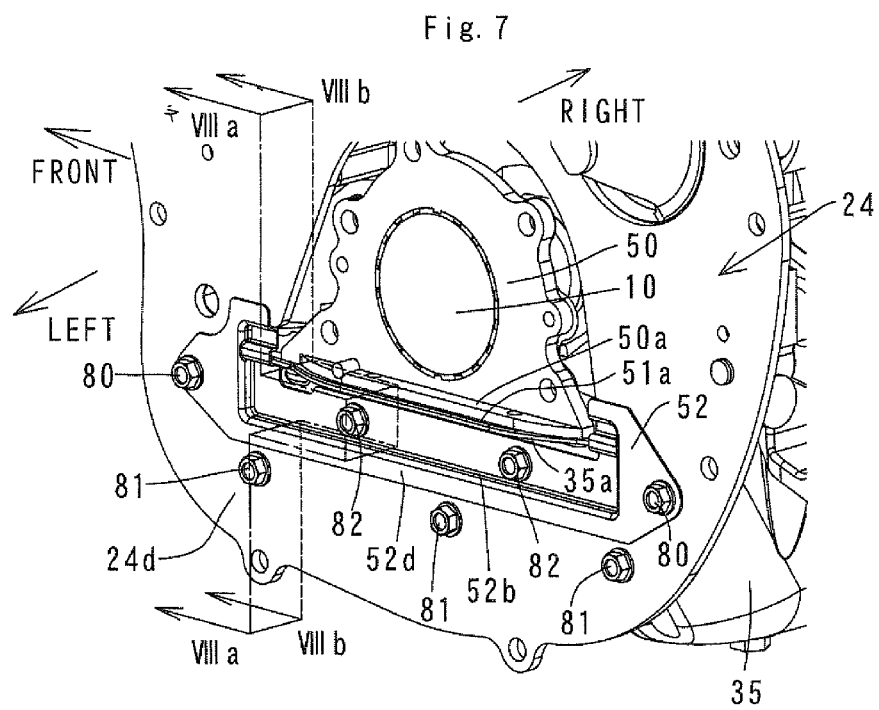
FIG. 7 is a perspective view of the coupling plate in a state where it is mounted on the engine.
Figure 8:
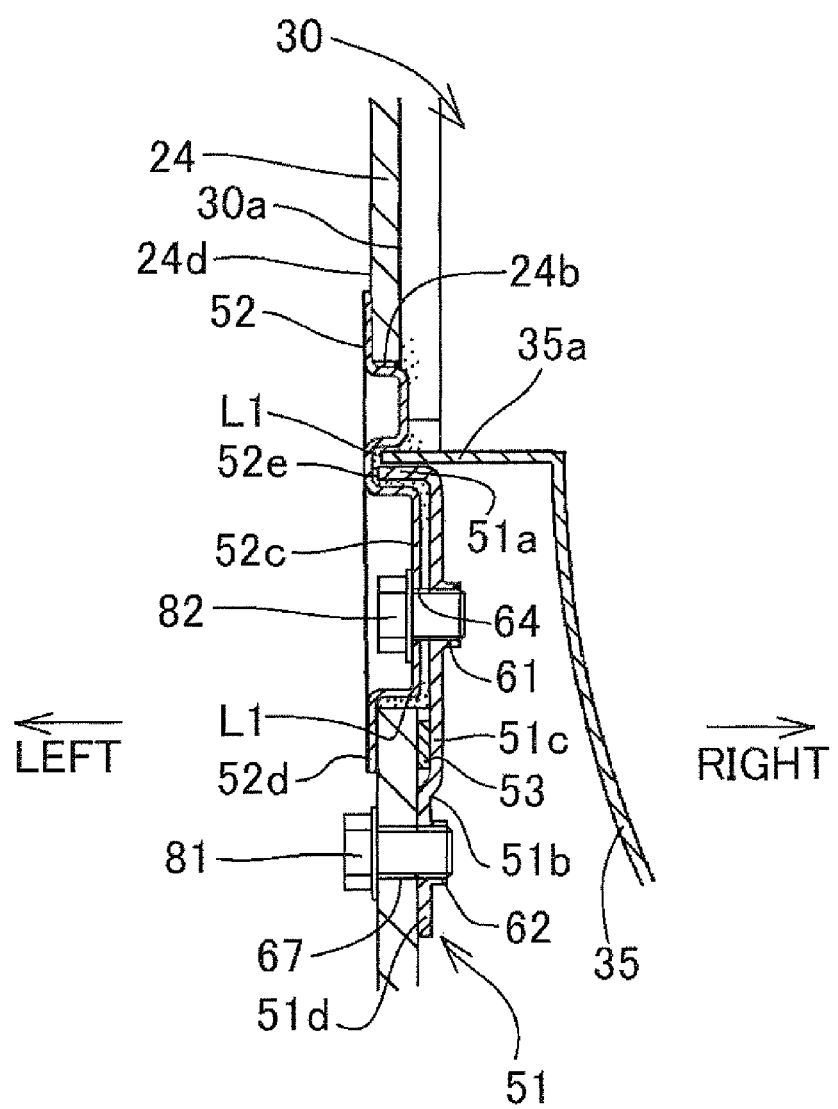
FIG. 8 is a sectional view taken along line VIIIa-VIIIa and line VIIIb-VIIIb in FIG. 7 (corresponding to sectional view taken along line VIII-VIII in FIG. 10)

FIG. 7 is a perspective view of the coupling plate 24 and the first and second seal plates 51 and 52 in a state where they are mounted on the engine 2. FIG. 8 is a sectional view taken along line VIIIa-VIIIa and line VIIIb-VIIIb in FIG. 7. In FIG. 8, a lower end of the coupling plate 24 is coupled with the outside portion 51d of the first seal plate 51 by inserting bolts 81 into the third bolt insertion holes 67 of the coupling plate 24 and then screwing them in the second female thread holes 62 of the first seal plate 51.

The inside portion 52c of the second seal plate 52 is fitted into the opening-expanded portion 24b of the coupling plate 24. The outside portion 52d of the second seal plate 52 abuts against a left end surface (transmission case mounting surface 24d) of the coupling plate 24. The second seal plate 52 is coupled with the first seal plate 51 by inserting bolts 82 into the first bolt insertion holes 64 of the inside portion 52c of the second seal plate 52 and then screwing them in the first female thread holes 61 of the first seal plate 51. In this state, the elastic seal member 53 is sandwiched under constant pressure, between the right end surface of the coupling plate 24 and a left end surface of the first seal plate 51.

In FIG. 7, in a state where the coupling plate 24 and the first and second seal plates 51 and 52 are assembled, the left end of the upper end flange 35a of the oil pan 35 and the oil seal case 50 project leftward more than the transmission case mounting surface 24d of the coupling plate 24.

Figure 10:
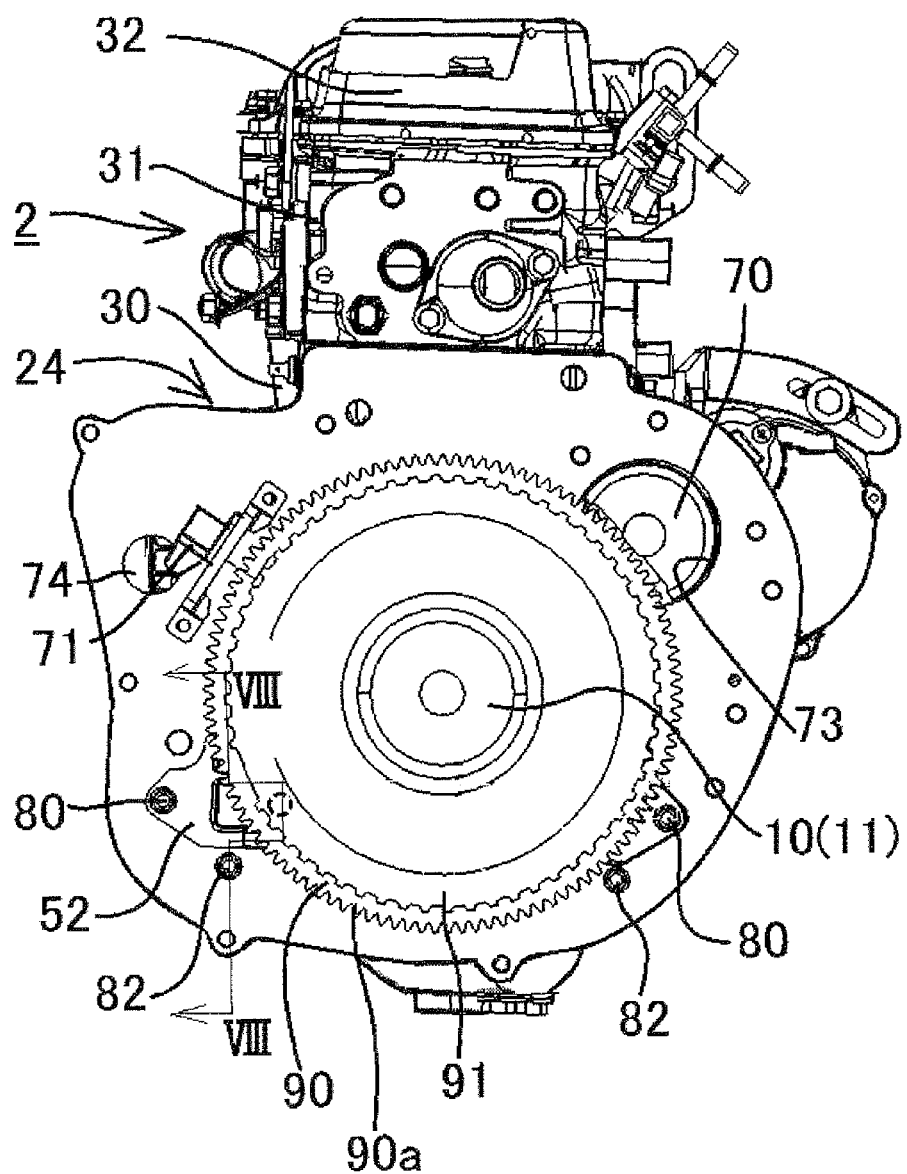
FIG. 10 is a side view of the engine in FIG. 1 in a state where the V-belt type continuously variable transmission is removed.

FIG. 10 is a left side view of the engine 2 after the coupling plate 24 is mounted. A flywheel 90 including a starter gear 90a and a rotation-number detecting disk 91 are coupled with the crankshaft 10.

Locations where the liquid seal agent (liquid gasket) L1 is applied or charged are shown by a large number of dots in the drawings, and these locations are as follows.

Figure 9:
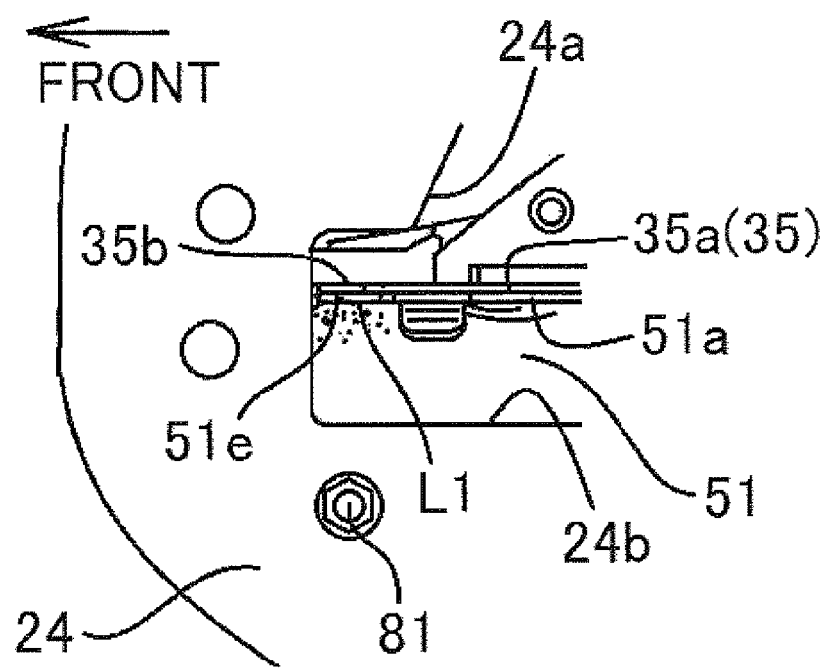
FIG. 9 is a partial side view of the coupling plate in its mid assembled state.

These locations are the plate mounting surface 30a of the cylinder block 30 shown in FIG. 4, the three second female thread holes 62 of the first seal plate 51 and the upper surface of the upper end bent portion 51a shown in FIG. 5, an outer peripheral edge of the U-shaped step 52b of the second seal plate 52 and insides of the pair of the recesses 52e shown in FIG. 6, and a mounting surface 70a of the starter motor 70 shown in FIG. 11. FIG. 9 shows a state of the coupling plate 24 and the first seal plate 51 before the second seal plate 52 (FIG. 7) is mounted. The liquid seal agent L1 is also applied to the connected portions (and also to locations in the vicinity of the connected portions) between the notches 35b in the front and rear ends of the upper end flange 35a of the oil pan 35 and the notches 51e of the front and rear ends of the first seal plate 51.

One example of the mounting operation will be described below.

(1) As shown in FIG. 5, the liquid seal agent L1 is applied to the upper surface of the upper end bent portion 51a of the first seal plate 51, the upper end bent portion 51a is abutted against the lower surface of the left end of the upper end flange 35a of the oil pan 35, and the oil seal case 50 is placed on the upper surface of the left end of the upper end flange 35a.

(2) The bolts 59 are inserted, from below, into the bolt insertion holes 57 of the first seal plate 51 and the bolt insertion holes 55 of the upper end flange 35a, and the pair of bolts 59 are screwed in the female thread holes 50b of the oil seal case 50, to thereby couple the first seal plate 51 and the oil seal case 50 with the upper end flange 35a of the oil pan 35.

(3) In FIG. 4, the elastic seal member 53 is fitted into the step 51b of the first seal plate 51, and the liquid seal agent L1 is applied to the plate mounting surface 30a of the cylinder block 30. Then, a plurality of bolts (not shown) inserted into the first bolt insertion holes 41 of the coupling plate 24 are screwed in the female thread holes 30c of the plate mounting surface 30a, to thereby mount the coupling plate 24 on the plate mounting surface 30a of the cylinder block 30. Further, the lower end of the coupling plate 24 is coupled with the outside portion 51d of the first seal plate 51 by three bolts 81.

(4) In FIG. 9, the liquid seal agent L1 is applied to the connected portions (and also to locations in the vicinity of the connected portions) between the notches 35b in the front and rear ends in the upper end flange 35a of the oil pan 35 and the notches 51e in the front and rear ends of the first seal plate 51. In FIG. 6, the liquid seal agent L1 is applied to the outer peripheral edge of the U-shaped step 52b of the second seal plate 52, and the liquid seal agent L1 is also charged into the pair of recesses 52e.

(5) As shown in FIG. 8, the inside portion 52c of the second seal plate 52 is fitted into the opening-expanded portion 24b of the coupling plate 24. At this time, connected portions between the upper end flange 35a of the oil pan 35 and the upper end bent portion 51a of the first seal plate 51 are fitted into the front and rear recesses 52e of the second seal plate 52.

(6) In FIG. 8, the inside portion 52c of the second seal plate 52 is coupled with the inside portion 51c of the first seal plate 51 by the pair of front and rear bolts 82. As shown in FIG. 7, the second seal plate 52 is coupled with the coupling plate 24 by the pair of front and rear bolts 80.

(7) In FIG. 11, the starter motor 70 and the rotation-number sensor 71 are assembled into portions corresponding to the first and second mounting holes 73 and 74, respectively.

(8) After the coupling plate 24, the first and second seal plates 51 and 52, the starter motor 70, and the rotation-number sensor 71 are assembled, the flywheel 90 and the rotation-number detecting disk 91 are coupled with each other as shown in FIG. 10. Then, the members incorporated in the V-belt type continuously variable transmission 6 such as the variable speed input shaft 11, the drive pulley 15, the driven pulley 16, the variable speed output shaft 13, and the V-belt 17 shown in FIG. 1 are assembled.

(9) Lastly, the transmission case 20 and the case cover 21 shown in FIG. 3 are assembled.

The above-described assembling order is merely one example, and the assembling order is not limited thereto.

Effects of Embodiment (1) In FIG. 4, in the engine having the structure in which the upper end flange 35a of the oil pan 35 projects outward in the crankshaft direction more than the plate mounting surface 30a of the cylinder block 30, since the first and second seal plates 51 and 52 are used together with the coupling plate 24, the V-belt type continuously variable transmission 6 can be coupled with the engine. In addition, the coupled portions can be entirely sealed, and it is possible to prevent water and mud from entering the V-belt type continuously variable transmission 6 from outside through the coupled portions.

More specifically, the second opening 24a for passing therethrough the crankshaft is provided in the coupling plate 24. Since the second opening 24a also includes the opening-expanded portion 24b in which the leftward projecting portion of the upper end flange 35a of the oil pan 35 is accommodated, even the flat coupling plate 24 having the simple shape can be coupled with the plate mounting surface 30a of the cylinder block 30 without gap. In addition, since the first and second seal plates 51 and 52 disposed on both sides (both right and left sides) of the coupling plate 24 in the vehicle-width direction seal the opening-expanded portion 24b, it is possible to entirely seal the coupled portions between the V-belt type continuously variable transmission 6 and the engine 2 by the coupling plate 24. Accordingly, it is possible to prevent water and mud from entering the V-belt type continuously variable transmission 6 from outside through the coupled portions.

(2) In FIGS. 4, 5, 6 and 9, the liquid seal agent L1 is applied or charged to the plate mounting surface 30a of the cylinder block 30, the second female thread holes 62 of the first seal plate 51, the upper surface of the upper end bent portion 51a, the peripheral edge of the step 52b of the second seal plate 52, the insides of the recesses 52e, and the connected portions between the notches 35b in the front and rear ends of the upper end flange 35a and the notches 51e in the front and rear ends of the first seal plate 51. Therefore, it is possible to enhance the sealing performance for preventing water from entering the V-belt type continuously variable transmission 6 by the simple application operation and charging operation of the liquid seal agent L1.

(3) In FIG. 11, the mounting hole 73 for mounting the starter motor and the mounting hole 74 for mounting the rotation-number sensor are formed in the coupling plate 24. Therefore, dedicated mounting parts for the starter motor 70 and the rotation-number sensor 71 are unnecessary, and the number of parts is reduced.

(4) In FIG. 4, since the elastic seal member 53 is interposed between the first seal plate 51 and the coupling plate 24 in its compressed state, the sealing performance between the first seal plate 51 and the coupling plate 24 is enhanced.

(5) In FIG. 8, the front and rear ends of the upper end flange 35a of the oil pan 35 and the front and rear ends of the first seal plate 51 are accommodated in the recesses 52e formed in the front and rear ends of the second seal plate 52, and the liquid seal agent L1 is charged into the recesses 52e. Therefore, after the liquid seal agent L1 is charged, the liquid seal agent L1 can be held in the recesses 52e, and it is possible to prevent the liquid seal agent L1 from being peeled off or from falling.

Other Embodiment (1) The engine to which the present invention is applied is not limited to the parallel three-cylinder engine. A single-cylinder engine, a two-cylinder engine, a four or more-cylinder engine, and a V-type engine are also included in engines to which the present invention is applied.

(2) Various modifications and changes can be made in the present invention without departing from the spirit and scope of the invention as set forth in the following claims.

What is claimed is:

1. A structure for coupling a V-belt type continuously variable transmission with an engine, the structure comprising:
   a plate mounting surface formed on one end surface of an engine case in a crankshaft direction, the plate mounting surface including a first opening through which a crankshaft passes, a lower end of the first opening being closed by an upper end flange of an oil pan mounted on a lower end of the engine case;
   a coupling plate mounted on the plate mounting surface, the coupling plate including a second opening through which the crankshaft and the upper end flange of the oil pan pass and a transmission case mounting surface,
   a first seal plate that is mounted on a lower surface of the upper end flange and that covers a lower portion of the second opening from an engine case side, the first seal plate having an L-shaped cross section; and
   a second seal plate that is mounted on a transmission case side of the coupling plate and that includes a recess covering ends of connected portions between the upper end flange and the first seal plate.

2. The structure for coupling the V-belt type continuously variable transmission with the engine according to claim 1, wherein a liquid seal agent is charged between the ends of the connected portions and a recess of the second seal plate.

3. The structure for coupling the V-belt type continuously variable transmission with the engine according to claim 1, wherein the coupling plate further includes a starter mounting portion.

4. The structure for coupling the V-belt type continuously variable transmission with the engine according to claim 1, wherein the coupling plate further includes a rotation-number sensor mounting portion.

5. The structure for coupling the V-belt type continuously variable transmission with the engine according to claim 1, wherein an elastic seal member is interposed between the first seal plate and the coupling plate.

* * * * *